United States Patent Office

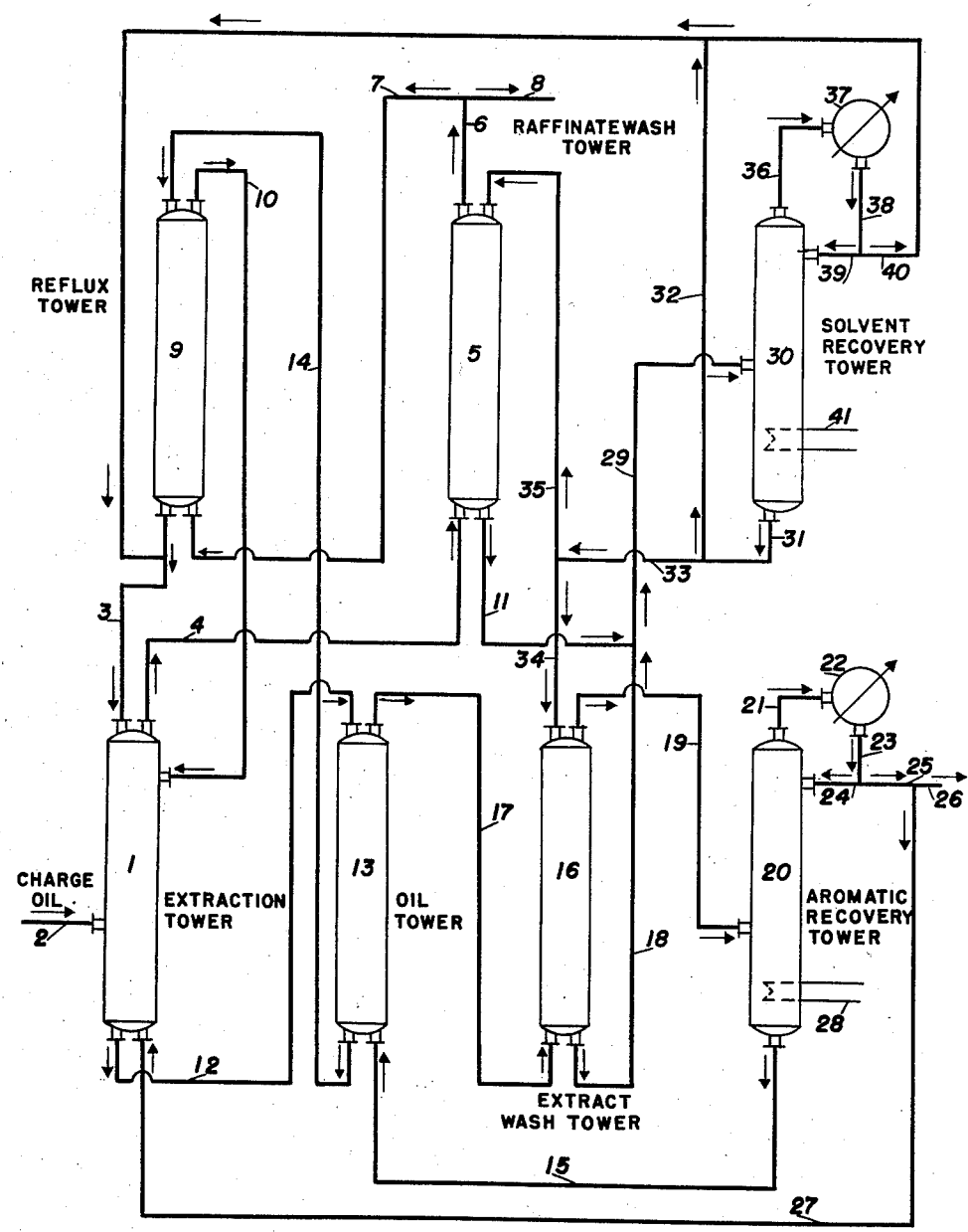

2,915,569
Patented Dec. 1, 1959

2,915,569

EXTRACTION PROCESS FOR RECOVERY OF AROMATICS UTILIZING CARBAMATE SOLVENTS

LeRoi E. Hutchings, Crystal Lake, Ill., assignor to The Pure Oil Company, Chicago, Ill., a corporation of Ohio Application December 23, 1957, Serial No. 704,791

5 Claims. (Cl. 260—674)

This invention relates to an extraction process for the recovery of aromatic hydrocarbons and alkylated homologues thereof from hydrocarbon mixtures containing same. More particularly, this invention relates to an improved solvent extraction process employing carbamate esters or carbamate salts as the solvent, and a technique for separation of the extracted hydrocarbons from the extract phase by contact of that phase with a secondary solvent comprising a high-boiling paraffinic hydrocarbon boiling well above the boiling point of the extracted hydrocarbons and being immiscible with said solvent.

The art recognizes the difficulties attendant on the separation of hydrocarbons having similar boiling points and many methods have been perfected for effecting such separations, including highly complex fractional distillation, chemical processes, selective adsorption systems, solvent extraction and the like. The solvent extraction process has been explored with particular vigor because of the availability of a large number of new solvents and the general simplicity and efficiency of this method. For this purpose, many different solvents have been proposed connected with various techniques for recovery of the desired extract from the extract phase and solvent purification. Ordinarily in these solvent extraction processes, the extraction is effected in the liquid phase by thoroughly mixing the hydrocarbon mixture with the solvent, allowing the resultant mixture to separate into two phases and separating the phases by decantation. In vapor phase extractions the solvent is passed countercurrently over extended contact surfaces. The overhead vapor phase contains the relatively more saturated hydrocarbons and the down-flowing liquid phase is essentially solvent and unsaturates. The main problem in either vapor or liquid phase extractions is the separation of the aromatics from the solvent phase. The more effective the extractive characteristics of the solvent, the less ideal the solvent phase becomes and consequently the separation is correspondingly more difficult. Simple distillation or fractionation sometimes results in incomplete separation, or contamination of the extract due to solvent decomposition at the temperature necessary to accomplish separation. Also, if the separation is not complete, the recycled solvent gradually loses its efficiency due to the accumulation of undesirable fractions therein. Where there is some contamination of the extract phase from the solvent extraction, separation of the aromatics from the solvent is further complicated. The use of an antisolvent such as water often causes emulsion difficulties both in the primary extraction stage and the separation of solvent from the extracts and raffinates.

This invention is based on the discovery that the separation of the extracted hydrocarbons from the extract phase can be accomplished by washing the extract phase with a paraffinic hydrocarbon having a boiling point well above that of the extracted hydrocarbons, and that this type of separation eliminates the necessity for elevated temperatures in the recovery of the aromatics from the extract. This is important when using hydrolytically and thermally unstable carbamates as solvents. It also makes possible the use of solvents which have the same boiling range as the aromatics. Solvents which decompose at above 300° F. to 400° F., cannot be used without applying high vacuum. Also, if solvents are used which contain large amounts of water, the water distills with the aromatics and the cost of recovering the aromatics becomes prohibitive. Because of the peculiar nature of the carbamates used in the process described herein, i.e., their physical and chemical characteristics, their tendency to azeotrope with certain paraffins, and complete solubility in water, it is unusual to find that the water-dilution technique, the phase-separation technique using a high-boiling paraffin secondary solvent, and the water-wash procedure can be applied with success when using this type of solvent while at the same time using much lower temperatures than applied in the prior art. Further, this invention avoids the necessity of handling large volumes of wash water, and for large-capacity solvent-recovery facilities.

It becomes, therefore, a primary object of this invention to provide a solvent extraction process for the recovery of aromatic hydrocarbons from hydrocarbon mixtures. Another object of the invention is to provide a process for the recovery of aromatic hydrocarbons from hydrocarbon mixtures using carbamate solvents.

Another object of the invention is to provide a solvent extraction process using a carbamate solvent wherein lower extraction and phase-separation temperatures are made possible through the combined use of an antisolvent and a high-boiling paraffinic secondary solvent for the extract phase.

These and other objects of the invention will become apparent or be described as the description proceeds.

The invention is best described in relation to the attached drawing which is a flow diagram illustrating in a non-limiting manner the relationship of the various process steps to each other. In the drawing, the charge oil enters extraction tower 1 through line 2 and is countercurrently contacted with solvent entering the system from line 3. The solvent in line 3 contains about 10–20 volume percent of water brought about by the particular solvent recovery system to be described. Non-aromatic raffinate with a small amount of solvent leaves tower 1 via line 4 and passes to the bottom of raffinate tower 5. In tower 5, the raffinate is countercurrently contacted with downflowing water which removes the solvent, and the purified, non-aromatic stream leaves through line 6. Stream 6 divides into lines 7 and 8, a portion of the non-aromatic hydrocarbons being removed as finished product through line 8, and the balance being conducted to reflux tower 9 where the hydrocarbons enter at the bottom. In reflux tower 9, the recycle solvent is countercurrently contacted with the non-aromatic hydrocarbons to remove any aromatics remaining in the solvent in order that essentially pure solvent containing the proper amount of water, enters tower 1 through line 3. The non-aromatic stream, now containing a small amount of aromatics, leaves reflux tower 9 through line 10 and flows to tower 1 as reflux. Water containing solvent is removed from raffinate wash-tower 5 by means of line 11 for transfer to solvent recovery means, as described hereinafter.

The extract stream from tower 1 leaves via line 12 and is transferred to oil-tower 13 wherein it is contacted with the high-boiling paraffinic hydrocarbon entering through line 15. In tower 13 the aromatics are extracted from the primary solvent by the secondary solvent comprising a high-boiling paraffinic hydrocarbon. Denuded solvent containing only small amounts of aromatic hydrocarbons is taken from oil-tower 13, through line 14, to reflux-tower 9, wherein it is further freed of aromatics before entering line 3 to primary extraction tower 1.

The paraffinic oil-aromatics stream is transferred from oil-tower 13 to extract wash-tower 16 through line 17. In extract wash-tower 16, the paraffinic oil-aromatics stream is contacted with water from line 34 which removes any traces of solvent present. This results in a water-solvent solution which leaves through line 18 for transfer to solvent-recovery means as subsequently described below. The washed solution of aromatics in high-boiling, paraffinic hydrocarbon is transferred from tower 16 through line 19 to aromatics recovery-tower 20. In tower 20, the aromatics are distilled from the high-boiling paraffins and taken overhead through line 21, condenser 22 and line 23. Stream 23 splits into lines 24 and 25, the portion flowing through line 24 being returned to tower 20 as reflux. Line 25 divides into lines 26 and 27, line 26 removing substantially pure aromatics product from the process, and line 27 returning a portion of the aromatics to tower 1 as reflux. Heat is supplied to tower 20 by any suitable means, such as heating coil 28.

Solvent-water solutions from towers 5 and 16, flowing through lines 11 and 18, respectively, join in line 29 and are conducted to solvent recovery-tower 30, wherein solvent is distilled or stripped from the water present. The water leaves through line 31 which divides into lines 32 and 33. A controlled portion of the water is conducted through line 32 and is added to the purified solvent returning to tower 1, as described below, for the purpose of adjusting selectivity. Line 33 divides into lines 34 and 35, line 34 returning water to extract wash-tower 16, and line 35 returning water to raffinate wash-tower 5.

Solvent is taken overhead from tower 30 through line 36 to condenser 37, which leaves through line 38. Line 38 then divides into lines 39 and 40, line 39 returning a portion of the purified solvent to tower 30, as reflux, and line 40 conducting the remainder to join line 3 entering tower 1, after joining water-line 32. Heat is supplied to tower 30 by any suitable means such as coil 41.

As a specific example of my invention, feed stock consisting of 50% v. benzene and 50% paraffins enters the primary extraction tower and is contacted with dimethyl ammonium dimethyl carbamate in a solvent/hydrocarbon ratio of 2/1. The solvent contains 8.5% water. The extraction tower is a conventional, packed tower and contains 15 theoretical extraction stages. The extract stream flows to oil tower 13, a conventional packed column containing about 10 theoretical stages, where it is contacted with white oil in an oil/extract ratio of at least 2/1. The oil-aromatics stream then flows to extract wash-tower 16 where it is contacted with water in a water/oil-aromatics ratio of about 1/10 or less. The extract wash-tower is identical to the oil tower. The washed, oil-aromatics stream then is fractionated in aromatics-recovery tower 20, which is a conventional, bubble-tray fractionator having 10 theoretical plates, where white oil is removed (line 15) at a bottoms temperature of about 215° F., and benzene of 99.5% purity is removed overhead to about 176° F. The ratio of the amount of benzene returned through line 27 as reflux to that removed as product through line 26 is about 1/1.

Raffinate from the primary extraction tower is washed with water in a water-raffinate ratio of about 1/10 or less, in the raffinate wash-tower. This tower is a conventional, packed column having about 10 theoretical stages. Solvent is recovered from the water used in the two wash-towers by means of the solvent-recovery tower, a conventional bubble-tray column containing about 20 theoretical plates. The solvent recovered from this tower makes up about 10% or less of the total solvent flowing to the primary extraction tower. About one-fifth of the non-aromatic hydrocarbons taken overhead from the raffinate wash-tower are removed as product, and the other four-fifths are returned to the reflux tower.

In order to further illustrate the invention, a catalytic reformate, hereinafter described, was fractionated to recover a benzene concentrate containing about 52.5 vol. percent of benzene. About 3750 barrels per stream day of this benzene concentrate was treated in the operation illustrated by the flow diagram, and 1960 barrels per stream day of 99.5 volume percent pure benzene was recovered. It was found that the minimum solvent-to-feed ratio necessary for the extraction of 99.5 volume percent benzene, on a solvent-free basis, in primary tower 1 was 4.0. The actual solvent-to-feed ratio was 7.8 for which seven theoretical stages, equivalent to 24 actual sieve plates, were required for the extraction. The corresponding minimum reflux ratio of recycle benzene to feed was 0.66 and the actual ratio 1.8.

The extract product flowing through line 12 was composed of 77 volume percent dimethyl ammonium dimethyl carbamate and 23 volume percent of aromatics. This extract at a feed rate of 38,105 b.p.s.d. was countercurrently contacted with a heavy alkylate as the secondary solvent at a feed ratio of 0.4, entering tower 13 through line 15. The heavy alkylate-benzene extract product from tower 13 was sent via line 17 to tower 16, was water-washed therein, and the resulting solvent-free extract distilled in still 20 at 350° F. For the foregoing feed ratio of 0.4 to tower 13, it was found that five theoretical stages were required to produce an extract product composed of 63 volume percent alkylate, 36 percent benzene and 1 percent solvent. The raffinate product at line 18 was essentially pure solvent and water. Upon distillation of the preheated alkylate extract from line 19 in still 20, a net benzene product of 1960 barrels per stream day was recovered at line 26, and the second stream of recovered benzene was refluxed at 6900 barrels per stream day through line 27. The benzene product was countercurrently contacted with water to remove traces of solvent at a water-to-hydrocarbon ratio of 1:12. The washed benzene was dried over calcium chloride and the product found to have a purity of 99.6%.

The accumulation of benzene and higher-boiling aromatics in the solvent stream is prevented by distillation in still 20. This operation is combined with the solvent recovery by combining streams 11 and 18, from the primary raffinate tower 5 and the benzene wash-column 16, respectively, and treating the mixture in still 30, using 10 percent recycle from line 38. The overhead solvent product comprising 88 volume percent dimethyl ammonium dimethyl carbamate and 12 volume percent of water is returned via line 40. The bottoms product, composed of water and small amounts of aromatics, is split into four streams. One stream is returned to tower 5, the second to recycle via lines 32 and 40, the third to tower 18, and the fourth to a draw-off to prevent the accumulation of aromatics in the system.

It has been found that the high-boiling liquid hydrocarbon entering oil tower 13 by line 15, being substantially immiscible in the carbamate solvent and miscible with the extract hydrocarbons, causes practically complete separation of the extract hydrocarbon phase from the carbamate-hydrocarbon solution entering at line 12. In a preferred embodiment of the invention the high-boiling liquid hydrocarbon used to accomplish this separation has a boiling point sufficiently above that of the extract hydrocarbons so that the extract phase can be easily separated by distillation in recovery tower 20 without the use of vacuum or exacting fractionation.

Those hydrocarbons which have an extremely low solubility in the carbamate solvent and which are completely miscible with the hydrocarbons that are dissolved in the carbamate solvent will accomplish the purposes of this invention. Naphthenic and paraffinic hydrocarbons and mixtures thereof, having a boiling point at least about 50° F. above the extract hydrocarbons, are preferred. Such materials are derived from several sources in the refining of crude oils and distillates. Examples of suitable high-boiling oils or hydrocarbons that may be used as secondary solvents include white oil, catalytic alkylates, naphthenic oils and highly paraffinic material. The white oil may be either the refined or technical grade. White oils and catalytic alkylates are preferred since they have been found to be very suitable for the preparation of pure nitration-grade benzene from catalytic reformates by extraction with carbamate solvents. The properties of suitable secondary solvents found most suitable for use with carbamate solvents along with materials convertible into suitable solvents are given in the following Table I:

TABLE I
*Properties of secondary solvents*

| Secondary Solvent | Gravity, °API | ASTM Distillation, °F. | | | | | Doctor Test | Corrosion | Acid | Aniline Pt. | Wt. percent Sulfur | ASTM Gum, mg./100 vol. |
|---|---|---|---|---|---|---|---|---|---|---|---|---|
| | | IBP | 10% | 50% | 90% | EP | | | | | | |
| 1. Heavy alkylate | 51.3 | 355 | 371 | 388 | 495 | 560° | neg | neg | neut | 183 | | <0.5 |
| 2. Heavy alkylate | 48.5 | 416 | 428 | 448 | 539 | 616 | neg | neg | neut | | | <0.5 |
| 3. Light alkylate | 72.3 | 108 | 179 | 196 | 241 | 360 | | | neut | | <0.03 | <0.5 |
| 4. Light alkylate | 66.5 | 124 | 227 | 247 | 281 | 360 | | | neut | | <0.03 | <0.5 |
| 5. White oil | 27.5 | 570 | | | | 700 | neg | neg | neut | | 0.05 | |

The alkylates referred to herein are obtained by the catalytic alkylation of isobutane with various light olefins to yield highly-branched paraffins boiling in the gasoline boiling range. The light olefins include ethylene, propylene, butylenes and amylenes which, along with the isobutane, are by-products of the thermal and catalytic cracking processes used to produce high-octane motor gasolines. The catalysts most generally used for the alkylation are sulfuric and hydrofluoric acid, although aluminum chloride may also be used. Since alkylation is a conventional petroleum refining unit process which is widely employed in modern petroleum refining, it is sufficient to refer one skilled in the art to "Progress in Petroleum Technology, Advances in Chemistry Series, #5," ACS 1951, page 97 and United States Patents 2,435,761, 2,437,544 and 2,468,899 for further details. Alkylates will contain hydrocarbons which are essentially paraffinic and consist of a mixture of isoparaffins ranging from pentanes to decanes and higher, boiling from about 100° F. to 650° F.

Alkylates No. 1 through 4 referred to in Table I were obtained by the reaction of butylenes, from a catalytic cracking process, with isobutane in the presence of sulfuric acid at a temperature of about 30° to 50° F. using an auto-refrigerated cascade-type reactor operating at about atmospheric pressure. The product was debutanized and otherwise treated to remove unreacted butylene and excess acid to yield a total alkylate having a boiling range of about 100° F. to 560° F. The product was fractionated to yield the individual heavy fraction indicated. The boiling range of the heavy fractions of alkylate used may be adjusted as desired. Also, light alkylates as indicated in the table may be rerun and fractionated to produce heavy alkylate fractions boiling sufficiently high to be separable from the aromatics being extracted. Light alkylates 3 and 4 in the table could not be used to separate xylenes, for example, but constitute source materials for conversion into suitable high-boiling, paraffinic, secondary solvents by simple fractionation.

The process of this invention is applicable to the treatment of any type of hydrocarbon mixture from which economical amounts of aromatics, including benzene and alkyl homologues thereof, can be recovered. Such mixtures include products obtained from aromatization and similar reactions. The products obtained from catalytic reforming, hydrocracking and dehydrocyclization processes may be used as feed for the present process. Any mixtures containing a paraffinic or naphthenic-type hydrocarbon admixed with benzene, toluene, the xylenes, that is o-xylene, m-xylene and p-xylene, and also ethyl benzene, as simple or complex multi-component mixtures, may be used as the starting material. Such feed materials as petroleum distillates, naphthas, gasoline, kerosene, fuel oil fractions, and gas-oil fractions may be used. The charge material should be liquid at ordinary temperatures and not subject to decomposition at the extraction temperatures or reaction with the selective solvents used herein. One suitable charge oil is the class of products known in the art as catalytic reformates. These liquid products contain a fair concentration of desirable aromatic hydrocarbons. Catalytic reformates are obtained by treating naphthas to reforming, dehydrogenation, hydrocracking and dehydrocyclization reactions at temperatures ranging from 850° F. to 1000° F. with pressures up to 500 p.s.i.g. in the presence of a metal-containing catalyst.

As a more specific illustration, catalytic reformates obtained as a result of the treatment of a virgin naphtha (BR 175° F.–400° F., API gravity 50° to 60°) with a platinum-alumina catalyst at 875° F. to 975° F. and pressures ranging from 200 to 500 p.s.i.g. may be used. Reformates so produced contain from about 30 to 55 vol. percent of aromatics and constitute a preferred feed for the present process. For example, reformates produced by reforming a 200°–400° F. virgin naphtha at about 930° F. and 325 p.s.i.g. in the presence of a catalyst comprising about 0.1 wt. percent of platinum on an alumina base, are representative. In general, these reformates have a boiling range of about 125° to 400° F., an API gravity of 40° to 50°, and an aromatic content of 45–55 volume percent. A particularly suitable reformate is obtained by subjecting a charge naphtha having a boiling range of 178° F. to 389° F., an API gravity of 59.1°, a RON, clear, or 44.6, a RON+0.3 TEL of 71.4 and containing 0.01% sulfur, about 91.0 vol. percent of paraffins and naphthenes, 1.0 vol. percent olefins, and 8.0 vol. percent aromatics, to reforming at about 930° F., to produce a product having an API gravity of 49.2°, an I.B.P. of 128° F., an E.B.P. of 405° F., a RON, clear, of 89.4, a RON+.3 cc. TEL of 98.2, and containing about 48.0 vol. percent paraffins and naphthenes, 1.0 vol. percent olefins and 51.0 vol. percent of aromatics. By precise fractionation and blending to different octane numbers, it was determined that this reformate feed material exhibited the following analysis:

TABLE II
*Aromatics in reformate feed*

| Aromatic: | Vol. percent |
|---|---|
| Benzene | 4.19 |
| Toluene | 13.1 |
| Mixed xylene and ethyl benzene | 16.51 |
| $C_9$ and heavier | 17.2 |

Examples of the composition of other reformate feed hydrocarbons that may be used are shown in Table III giving the volume percent of aromatics in each, and the research octane level to which the reforming reaction was directed in each instance.

TABLE III

*Aromatics distribution in various reformates* [1]

[Volume Percent]

| Aromatic | 85 Research Octane Level | 95 Research Octane Level |
| --- | --- | --- |
| Benzene | 2.96 | 3.41 |
| Toluene | 9.64 | 12.9 |
| Ethyl-benzene | 2.55 | 2.72 |
| p-xylene | 2.74 | 2.83 |
| m-xylene | 6.45 | 6.73 |
| o-xylene | 3.96 | 3.81 |
| $C_9$ and heavier aromatics | 17.3 | 22.4 |
| Total | 45.6 | 54.8 |

[1] These reformate products were from different feed stocks.

In general these feed stocks contain a mixture in various proportions of i-butane, n-butane, i-pentane, n-pentane, cyclopentane, 2,2-dimethylbutane, 2,3-dimethylbutane, 2-methylpentane, 3-methylpentane, n-hexane, methylcyclopentane, 2,2-dimethylpentane, benzene, 2,4-dimethylpentane, cyclohexane, 2,2,3-trimethylbutane, 3,3-dimethylpentane, 1,1-dimethylcyclopentane, 2,3-dimethylpentane, 2-methylhexane, cis-1,3-dimethylcyclopentane, trans-1,2-dimethyl cyclopentane, 3-ethylpentane, n-heptane, 2,2,4-trimethylpentane, cis-1,2-dimethylpentane, methylcyclohexane, methylethylcyclopentane, and other $C_8$ hydrocarbons, toluene, ethylbenzene, p-xylene, o-xylene and m-xylene. These represent the types of hydrocarbon mixtures from which the aromatics, as enumerated, can be separated by the present process. In using reformates as feed hydrocarbons, one purpose is to separate the low-octane components so that they may be recycled or otherwise upgraded in octane number, and the high-octane products recovered for gasoline blending.

Another type of feed mixture comprises various fractions and mixtures of fractions of reformates which may be used in this invention. For example, a reformate or other source of aromatics may be fractionated to form a benzene concentrate, a toluene concentrate and a xylene concentrate; these may be individually treated or mixed in various proportions and treated to solvent extraction in accordance with this invention to obtain products having a high concentration of the desired aromatic. One such feed material comprises a synthetic mixture of 1 part benzene concentrate, 2 parts toluene concentrate and 1 part xylene concentrate. The purpose of treating such concentrates is to recover aromatics of maximum purity for use as organic intermediates, solvents, etc.

The selective solvents that may be used are broadly from the class of stable N-substituted carbamates in the form of esters or ammonium salts thereof which may contain other functional substituents. Examples include 2-hydroxyethyl N-methyl carbamate, 2-hydroxyethyl N-ethyl carbamate, 2-hydroxyethyl N-isopropyl carbamate, 2-hydroxyethyl N,N-dimethyl carbamate. Examples of the salts include dimethyl ammonium dimethyl carbamate, B.P. 140.3° F., sp. gr. 1,026, abs. vis. @ 25° C. 63.3 cps. and RI @ 25° C. pf 1.4512, and methylethyl ammonium methylethyl carbamate boiling at about 131° F. Other carbamates may be used as long as they are stable and selective for the intended purpose of the extraction. Certain ammonium derivatives of N-substituted carbamates lack stability such as the methyl-methyl compound, the ethyl-ethyl compound and the diethyl-diethyl compound, along with certain higher molecular weight derivatives such as the 1-propyl, and n-octyl compounds. As a consequence, these materials cannot be used. Certain other ammonium derivatives of N-substituted carbamates, such as the benzyl-benzyl compound, are solids and either have to be used with an auxiliary solvent or employed at higher temperatures during the extraction.

The process is carried out at temperatures between about 70° F. to 150° F. using atmospheric pressures. The amount of solvent used per volume of charge oil is dependent upon the type of feed, the type of extraction used, whether batch, co-current or counter-current, the type of carbamate solvent and the operating conditions imposed. In general, between about 1 to 30 volumes of solvent per volume of charge oil may be used. The extraction may be carried out with the solvent in substantially anhydrous condition or containing from about 1 to 20% by weight of water based on the solvent composition. Certain of the carbamates work best with water present such as dimethyl ammonium dimethyl carbamate, requiring about 20% by weight of water.

What is claimed is:

1. An aromatic hydrocarbon refining process which comprises contacting a liquid petroleum mixture containing appreciable amounts of aromatic hydrocarbons with a solvent selected from the group of 2-hydroxy-ethyl N-methylcarbamate, 2-hydroxyethyl N-ethylcarbamate, 2-hydroxyethyl N-isopropyl carbamate, 2-hydroxyethyl N,N-dimethyl carbamate, dimethyl ammonium dimethyl carbamate, methylethyl ammonium methylethyl carbamate, and benzyl ammonium N-benzyl carbamate in an extraction treatment in the presence of between about 8.0 to 15.0 weight percent of water, separating a first extract phase comprising solvent and said aromatic hydrocarbons from a first raffinate phase, contacting said extract phase with a high-boiling hydrocarbon selected from the group consisting of paraffins and alkylates, said high-boiling hydrocarbon being characterized by having a boiling point higher than the aromatic hydrocarbons being separated, under conditions to form a second raffinate phase consisting essentially of said solvent and a second extract phase consisting essentially of said aromatic hydrocarbons and said high-boiling hydrocarbon, separating said second raffinate phase from said second extract phase, contacting said first raffinate phase with water to remove the solvent therefrom to form a solvent-free raffinate and a third extract phase comprising water and said solvent, contacting said second raffinate phase with a portion of said solvent-free raffinate to form a solvent-rich phase and a raffinate-rich phase containing aromatics from said second raffinate, recycling said solvent-rich phase and said solvent-free raffinate to said first contact step, contacting said second extract phase with water to form a fourth extract phase comprising water and said solvent, and a solvent-free phase comprising said high-boiling hydrocarbon and said aromatic hydrocarbon, combining said third and fourth extract phases, distilling the combined mixture to recover water for recycle to said second extract phase treating-step and to said first raffinate phase treating-step, and purified solvent as separate fractions, recycling said purified solvent to said recycled solvent-rich phase passing to said first contact step, subjecting said solvent-free phase to distillation to recover as separate fractions said high-boiling hydrocarbon and said aromatic hydrocarbon, recycling said high-boiling hydrocarbon to contact with said first extract phase and recovering said aromatic hydrocarbon in substantially pure condition.

2. The process in accordance with claim 1 in which said high-boiling alkylate consists in an alkylate fraction boiling in the range of about 100° to 560° F. prepared by the catalytic alkylation of isobutane with light olefins.

3. The process in accordance with claim 1 in which the hydrocarbon mixture being treated comprises a catalytic reformate having a boiling range of about 100° to 450° F.

4. The process in accordance with claim 1 in which said hydrocarbon mixture consists in a mixture of a benzene concentrate, a toluene concentrate and a xylene concentrate boiling in the range of about 128° F. to 405° F. resulting from the fractionation of said catalytic reformate, 5. The process in accordance with claim 4 in which said mixture of concentrates consists of about 1 part benzene concentrate, 2 parts toluene concentrate and 1 part xylene concentrate.

References Cited in the file of this patent

UNITED STATES PATENTS

| | | |
|---|---|---|
| 2,304,280 | Tongberg | Dec. 8, 1942 |
| 2,343,841 | Burk | Mar. 7, 1944 |
| 2,391,104 | Read | Dec. 18, 1945 |
| 2,481,843 | Holt et al. | Sept. 13, 1949 |
| 2,594,044 | Loder | Apr. 22, 1952 |
| 2,689,819 | Shelton et al. | Sept. 21, 1954 |
| 2,727,848 | Georgian | Dec. 20, 1955 |